B. C. ADAMS.
ATTACHMENT FOR RIDING SADDLES.
APPLICATION FILED MAY 12, 1916.
1,226,623.
Patented May 22, 1917.
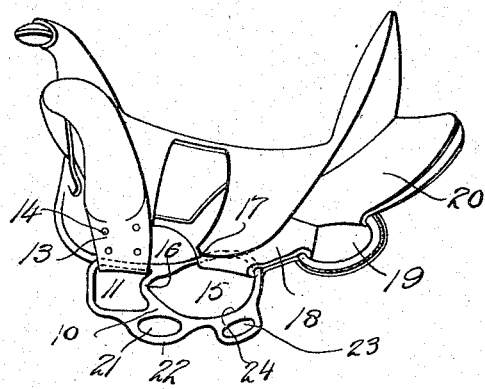
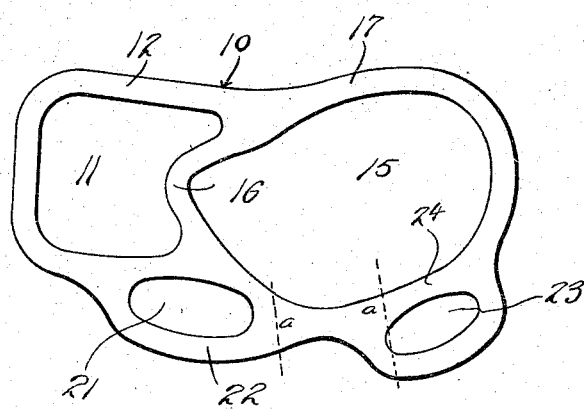
WITNESSES
INVENTOR
Benton C. Adams.
BY
ATTORNEY

UNITED STATES PATENT OFFICE.

BENTON C. ADAMS, OF MILES CITY, MONTANA.

ATTACHMENT FOR RIDING-SADDLES.

1,226,623.

Specification of Letters Patent.

Patented May 22, 1917.

Application filed May 12, 1916. Serial No. 97,078.

*To all whom it may concern:*

Be it known that I, BENTON C. ADAMS, a citizen of the United States, residing at Miles City, in the county of Custer and State of Montana, have invented certain new and useful Improvements in Attachments for Riding-Saddles, of which the following is a specification.

This invention relates to an attachment for riding saddles and has for its object to provide such an attachment which may be incorporated in saddles at present in use or with new saddles whereby the cinch or girth that passes under the body of the horse may be placed in one of several positions as the rider may desire or as the work to be performed calls for.

In certain sections of the country, riding saddles are secured in position on a horse by what is known as a single or double rig, or in other words, by one or two cinches or girths, and the single rig being further classified as Spanish, three-quarters and center fire rig, depending upon the distance of the girth from the fore legs of the animal. The various rigs require different points of attachment to the saddle-tree and to simplify the construction and use of saddles by combining in a single article on each side, means whereby the cinch or girth may be attached for any one of the several rigs, is the principal object of this invention.

In the accompanying drawings:

Figure 1 is an elevation of a saddle tree partly covered showing my invention applied thereto in position for use, and Fig. 2 is an enlarged side view of the attachment separated from the saddle.

Referring to the drawing, 10 indicates the attachment which comprises a plurality of loops integrally formed of metal either by forging or welding, or cut from a single sheet and finished by rounding the corners to impart a smooth finish when necessary. One of the loops 11 forming the attachment 10 is at the front end of the same and has a substantially straight bar as 12 at the top around which passes a strap 13 for securing this end of the attachment to the saddle tree by rivets 14, or other means which will fasten the strap to the saddle.

Back of the loop 11 is a second loop 15 larger than the loop 11 and somewhat egg-shaped in form, a curved bar 16 separating the loops 11 and 15. This bar is curved in this manner to enlarge the horizontal dimension of the loop 15 in order to accommodate both the stirrup strap and a girth strap when the latter is attached to the lower bar of the loop in certain arrangements of the securing rig for the saddle, this arrangement being known as the three-quarter rig. The enlargement of the loop 15 also permits the stirrup strap to shift freely along the length of the loop. Around the top bar 17 of the loop 15 is passed a strap 18 that is attached to the saddle tree and also to a ring 19 connected by a fastening strap 20 to the rear of the saddle.

Below the connecting bar 16 and extending under the loops 11 and 15 and about midway between the two is a third loop 21 smaller than either the loop 11 or 15. A fourth loop 23, behind the loop 21 and separate therefrom is formed on the bottom bar 24 of the large loop 15.

Two of such attachments as above described are secured to a saddle one on each side in the manner shown in Fig. 1 of the drawing and over this attachment, the loose descending skirt portion or jockey of the saddle hangs, but for illustrative purposes is omitted in the drawing. The attachment besides its principal use of forming a convenient and properly placed means to which the cinch or girth is fastened, also serves to hold the jockey outward and prevent the depressions which usually form therein at the base of the saddle tree. When the saddle is to be secured on a horse by what is known as the three-quarter rig, a cinch or girth is fastened to the loop 15 of each attachment just behind the loop 21 between the dotted line *a—a* of Fig. 2. In using the Spanish rig, the cinch or girth is secured to the loops 21 and extends under the horse's chest in front of the position of the girth in the three-quarter rig, while for the center fire rig, the cinch or girth is secured in loops 23 behind the three-quarter rig position. The double rig is used when extra security is required and employs two cinches or girths, one being connected to the loops 11 in front of the Spanish rig loops 21 and the other fastened behind the attachment to the rings 19 at the rear of the saddle. The stirrup straps pass through the loops 15 of the attachments and hang downward in the usual position.

A saddle provided with a complement of attachments such as described will enable the rider to change the rig or means of securing the saddle with little or no trouble, it being only necessary to disengage the cinch fastenings, remove them from one loop and secure them to either one of the other loops as may be necessary and if a double rig is to be used, an additional cinch or girth is attached to the rings 19. The attachment is flat, lies close to the horse, does not incommode him and is out of the way, being hidden by the jocky or saddle skirt and does not have sufficient thickness to form a protuberance at the side, but on the contrary, provides a support for the jockey and prevents the side depressions, so common in saddles, from forming therein.

What is claimed as new is:

An attachment for saddles comprising a flat metal member designed to be secured on the sides of a saddle and provided with a forward loop, and a rearward loop to receive saddle attaching straps that encircle the top bars of the loops, a bar dividing said loops and curved toward one loop to permit the stirrup strap to shift freely along the length of the other loop, said loops being designed to support girth straps on their bottom bars, a smaller girth strap loop below the lower end of said dividing bar, and a similar loop at the lower rear portion of said member, each of the two last mentioned loops also being adapted to receive a girth strap, when the securing rig for the saddle is to be changed.

In testimony whereof I affix my signature in presence of two witnesses.

BENTON C. ADAMS.

Witnesses:
G. N. SIGWART,
G. C. HARLAN.

Copies of this patent may be obtained for five cents each, by addressing the "Commissioner of Patents, Washington, D. C."